United States Patent [19]
Plisky

[11] 3,818,536
[45] June 25, 1974

[54] WINDSHIELD WIPER ASSEMBLY
[75] Inventor: John J. Plisky, Munster, Ind.
[73] Assignee: The Anderson Company, Gary, Ind.
[22] Filed: Aug. 29, 1972
[21] Appl. No.: 284,950

[52] U.S. Cl. ............................................. 15/250.42
[51] Int. Cl. ............................ B60s 1/04, B60s 1/38
[58] Field of Search ..................... 15/250.42, 250.36

[56] References Cited
UNITED STATES PATENTS
3,629,898  12/1971  Plisky .............................. 15/250.42
3,673,631  7/1972  Yamadai et al .................. 15/250.42
FOREIGN PATENTS OR APPLICATIONS
1,077,089  3/1960  Germany ......................... 15/250.42

*Primary Examiner*—Peter Feldman
*Attorney, Agent, or Firm*—Hofgren Wegner, Allen, Stellman & McCord

[57] ABSTRACT

This invention relates to windshield wiper assemblies which include a wiping element comprising a flexible support member and a resilient wiping member and a pressure-distributing superstructure comprising elongate members operatively connected together so as to transmit and distribute the pressure received by the pressure-distributing superstructure from the wiper arm to spaced locations along the length of the wiping element. The pressure-distributing superstructure has members whose ends are slidably engaged with the flexible support member of the wiping element. At least two of the members of the pressure-distributing superstructure are slidably engaged with said support member and have on at least one end thereof a generally V-shaped upper part, tabs adapted to engage the undersides of the edges of the support member and arcuate portions joining the V-shaped upper part and the tabs. Each V-shaped upper part has, at the outer end thereof, a portion of each side displaced downwardly so as to be parallel to the plane of and above the flexible support member and thereby slidably engages the support member with minimum lateral rotational play.

5 Claims, 4 Drawing Figures

PATENTED JUN 25 1974  3,818,536

WINDSHIELD WIPER ASSEMBLY

BACKGROUND OF THE INVENTION

1. Field of the Invention

This invention relates to improvements in windshield wiper assemblies of the type which have a wiping element comprising a flexible support member and a resilient wiping member and a pressure-distributing superstructure comprising elongate members which are operatively connected together to transmit and distribute pressure received from the wiping arm to spaced locations along the length of the wiping element and some of which have ends slidably engaging the support member of the wiping element.

2. Description of the Prior Art

Since the introduction in the 1940's of windshield wiper assemblies of the type generally shown in the John W. Anderson U.S. Pat. No. 2,596,063, such windshield wiper assemblies and variations thereof have been generally used throughout the automotive industry. These windshield wiper assemblies typically include a wiping element and a superstructure which consists of articulated parts so that pressure received from the wiper arm is transmitted through the superstructure to spaced locations along the wiping element for conformance to the windshield to be wiped. The wiping element consists of a flexible backing strip or support member, typically made of metal, and a resilient wiping member, typically made of rubber, which has a lower most portion or lip adapted to wipe a windshield.

One successful variation of such windshield wiper assemblies has been one in which the superstructure is made of articulated parts or members which generally have inverted V-shaped cross sections, the upper and lower members being rockably connected to each other. The ends of the members of the superstructure connected to the flexible support member are slidably engaged therewith in order to permit flexing of the wiping element when the windshield wiper assembly passes over a curved portion of the windshield. The slidable connections at the ends of members of the superstructure are commonly referred to as claws and, in respect to the type of superstructure described above, consist of a generally V-shaped upper part, tabs adapted to engage the undersides of the edges of the support member and arcuate portions joining the V-shaped upper part and the tabs. Since present day automobile manufacturers demand substantial control of the action of windshield wiper assemblies, the precision of the fit between the claws and the support member of the wiping element is important. When claws do not fit the support member with considerable precision, they can rotate laterally and rattle against each other to produce undesirable noise, the layover or tilt of the wiping element is not adequately controlled with resultant poor wiping and undesired movement in relation to each other produces wear.

SUMMARY OF THE INVENTION

A windshield wiper assembly of the type with which the invention is concerned comprises a wiping element comprising a flexible support member and a resilient wiping member engaged with said support member and having an edge adapted to contact and wipe a windshield, an arm-pressure distributing assembly adapted to receive pressure from a windshield wiper arm and transmit such pressure to said wiping element adjacent the ends of said wiping element and to at least one intermediate location, said pressure-distributing assembly comprising elongate members pivotally connected together to form an articulated structure whose members move relative to each other generally in a plane perpendicular to the surface to be wiped, and which has members with ends which are slidably engaged with said flexible support member, at least two of said members slidably engaged with said support member having on at least one end thereof a generally V-shaped upper part, tabs adapted to engage the undersides of the edges of said support member and arcuate portions joining said V-shaped upper part and said tabs. In accordance with the invention, each of said V-shaped upper parts has, at the outer end thereof, a portion of each side displaced downwardly so as to be parallel to the plane of and above said flexible support member and thereby slidably engage said support member with minimum lateral rotational play.

The above construction provides a close fit between the support member of the wiping element and the ends of members of the superstructure slidably engaged therewith. As explained more fully below, such closeness of fit results in a low level of noise at the connection, increased control of layover and reduced wear. It also results in a product which behaves in a more uniform manner in spite of variations in manufacture.

BRIEF DESCRIPTION OF THE DRAWINGS

The details of construction and operation of the invention are more fully described with reference to the accompanying drawings which form a part hereof and in which like reference numerals refer to like parts throughout.

In the drawings.

DESCRIPTION OF THE PREFERRED EMBODIMENT

Figure 1:
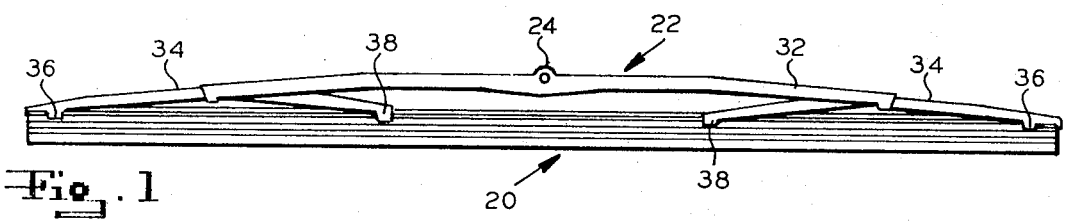
FIG. 1 is a side view of a windshield wiper assembly illustrating an embodiment of the invention.

The windshield wiper assembly shown in FIG. 1 comprises a wiping element indicated generally at 20 and an articulated pressure-distributing means or superstructure, indicated generally at 22, which receives pressure from a wiper arm (not shown but attachable at 24) and then distributes (i.e., transmits and proportions) such pressure to a plurality of positions, spaced locations or longitudinal points adjacent the ends and along the length of wiping element 20. Wiping element 20 is conformable to both flat and curved surfaces and, when urged toward a windshield by the pressure-distributing superstructure 22, automatically follows surfaces of varying curvatures such as those involved in wiping curved windshields.

Figure 2:
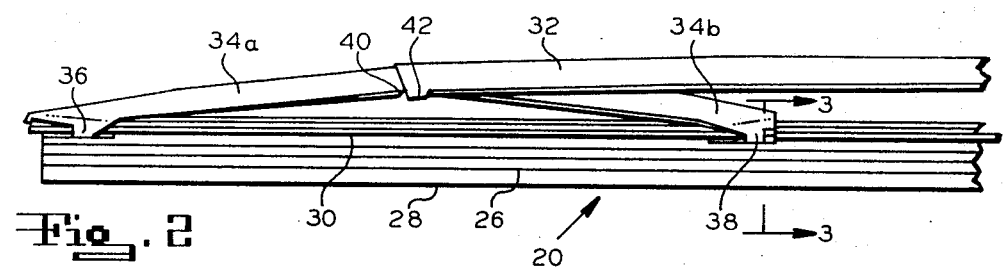
FIG. 2 is an enlarged side view of a portion of the windshield wiper assembly of FIG. 1.

Wiping element 20 comprises a resilient wiping member or squeegee 26 which may be made of rubber or other elastomeric material and which has a lowermost or bottom portion which has a wiping edge or lip 28 and a flexible support member or flexor 30 made of resiliently flexible material, such as metal or plastic of suitable thickness (see FIG. 2). Flexor 30 is maintained in association with the resilient wiping member 26 by various constructions known to the art, such as by retaining it in longitudinal grooves in the resilient wiping member 26. Flexor 30 may be unitary (i.e., joined at one or both ends) or may consist of two separate ribbons or strips, as is known to the art.

The pressure-distributing superstructure 22, shown in FIG. 1, comprises a primary or upper member, bridge or yoke 32 which is rockably connected at its ends to secondary or lower members, bridges or yokes 34 at the ends of each of which are claws 36 and 38 which transmit pressure to spaced locations on wiping element 20 and keep the articulated pressure-distributing superstructure 22 in operative association with blade element 20. At least some of the claws slide with respect to blade element 20 so that it can bow or flex without restriction by the pressure-distributing superstructure as it moves across various parts of the windshield. Various means known to the art may be used to prevent the pressure-distributing superstructure 22 from being longitudinally moved or slid off the wiping element in either direction. Those skilled in the art will understand that various arrangements of pressure-distributing superstructures other than that shown in FIG. 1 may be used in accordance with the invention. Such arm-pressure distributing superstructures characteristically transmit the arm pressure to the wiping element adjacent the ends of the wiping element and to at least one intermediate location spaced along its length and comprise elongate members rockably connected together to form an articulated structure whose members move relative to each other generally in a plane perpendicular to the surface to be wiped. The windshield wiper assembly may be constructed so that the wiping element 20 can be replaced, an appropriate construction being shown in U.S. Pat. No. 2,897,530, issued Aug. 4, 1959, to John W. Anderson.

Upper member 32 and lower members 34 are advantageously constructed so they have generally inverted V-shaped cross sections over most of their lengths although the width of any particular member may be different at various sections. Lower member 34 is arched, that is, the outboard portion 34a and the inboard portion 34b are inclined downwardly from the midpoint of member 34 (see FIG. 2). Accordingly, there is space between the inboard portion 34b of the lower member 34 and the underside of the end of upper member 32 so that, when the blade element if flexed upwardly when wiping a curved portion of the windshield, the inboard portion 34b of the lower member can pivot upwardly and nest within the corresponding portion of the upper member 32. A pivotal connection between members 32 and 34 is effected by notching the top of lower member 34 on each side of its bottom edges at 40 (see FIG. 2). Both sides of the upper member 32 have inturned fingers or tabs 42 which seat in the notches 40 in the bottom edges of the top of lower member 34. Tabs 42 can pivot or rock in the notches 40 and thus provide the desired pivotal movement.

Figure 3:
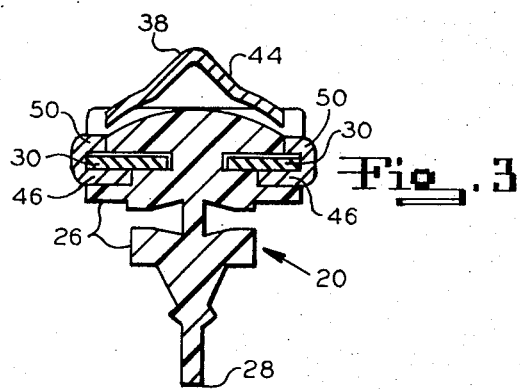
FIG. 3 is a greatly enlarged cross-sectional view of the wiping element and the inner end of a lower member of the pressure-distributing superstructure taken along the lines 3—3 of FIG. 2; and, FIG. 4 is a greatly enlarged end view of the inner end of the lower member of the pressure-distributing superstructure shown in FIG. 3.

Claws 36 (at the outer or outboard ends of lower members 34) and 38 (at the inner or inboard ends of members 34) slidably embrace flexor 30 (see FIG. 3).

As shown in FIG. 3, claws 36 and 38 comprise a generally V-shaped upper part 44, tabs 46 adapted to engage the undersides of the edges of flexor 30 and arcuate portions 48 joining upper part 44 and tabs 46. The precision of the fit between claws 36 and 38 and flexor 30 determine the amount of relative movement between these members. Because of the inverted V-shape of the ends of lower members 34, it is difficult to control the preciseness of the fit between the claws and the flexor. When the fit is not sufficiently precise, due, for example, to variations in manufacture, there is excessive relative movement between the claws and the flexor (i.e., lateral rotation), resulting in noise, wear, improper layover and chatter of the windshield wiper assembly.

Figure 4:
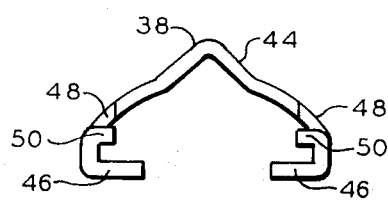

As shown particularly in FIGS. 3 and 4 and in accordance with the invention, a portion 50 of each side of the inverted V-shaped upper part 44 of the claw 38 at the inner end of lower members 34 is sheared or displaced downwardly so as to be parallel to the plane of and above flexor 30. Because of this construction the claws 38 engage the flexor 30 with more controllable precision of fit, resulting in minimum rotational or lateral play and consequent improved wiping performance. If desirable, claws 36, at the outer ends of lower members 34 may have a similar construction to that described in connection with FIGS. 3 and 4, although it is particularly advantageous to have at least the inner ends so constructed.

It will, of course, be understood that various details of construction may be varied without departing from the principles of this invention, and it is, therefore, not the purpose to limit the patent granted herein otherwise than necessitated by the scope of the appended claims.

I claim:

1. A windshield wiper assembly comprising a wiping element comprising a flexible support member and a resilient wiping member engaged with said support member and having an edge adapted to contact and wipe a windshield, an arm-pressure distributing assembly adapted to receive pressure from a windshield wiper arm and transmit such pressure to said wiping element adjacent the ends of said wiping element and to at least one intermediate location, said pressure-distributing assembly comprising elongate members pivotally connected together to form an articulated structure whose members move relative to each other generally in a plane perpendicular to the surface to be wiped, and which has members with ends slidably engaged with said flexible support member, at least two of said members slidably engaged with said support member having on at least one end thereof a generally inverted V-shaped upper part, tabs adapted to engage the undersides of the edges of said support member and arcuate portions joining said inverted V-shaped upper part and said tabs, each inverted V-shaped upper part having, at the outer end thereof, a partially severed portion of each side being displaced downwardly so as to lie parallel to the plane of and spaced above a portion of said tabs with said partially severed portions and said tabs slidably engaging the top and bottom edge portions of said support member to permit a minimum lateral rotational play therebetween.

2. A windshield wiper assembly comprising a wiping element having a flexible support member and a resilient wiping member engaged with said support member and having an edge adapted to contact and wipe a windshield, an arm-pressure distributing assembly adapted to receive pressure from a windshield wiper arm and transmit such pressure to said wiping element, said pressure-distributing assembly comprising elongate members pivotally connected together to form an articulated structure whose members move relative to each other generally in a plane perpendicular to the surface to be wiped, at least one of said members having spaced-apart tabs joined together by a shaped portion, said tabs being adapted to engage the undersides of the edges of said support member, said shaped portion being cut above the tab and having a part of each side displaced downwardly into a plane parallel to the plane of and above said flexible support member to thereby slidably engage said support member with minimum lateral rotational play.

3. A wiper assembly as claimed in claim 2 wherein said pressure-distributing assembly comprises upper and lower elongate members, said lower members having at both ends thereof a generally inverted V-shaped upper section, said spaced-apart tabs being joined to the outer end portions of the V-shaped section, each V-shaped section having said cut above said tab and said downwardly displaced part formed in the outer end portion thereof in close proximity to and spaced in a plane above and parallel to said tabs.

4. In a windshield wiper assembly comprising a wiping element having a flexible support member and a resilient wiping member engaged with said support member and having an edge adapted to contact and wipe a windshield, an arm-pressure distributing assembly adapted to receive pressure from a windshield wiper arm and transmit such pressure to said wiping element, said pressure-distributing assembly comprising an upper and two lower elongate members pivotally connected together to form an articulated structure whose members move relative to each other generally in a plane perpendicular to the surface to be wiped, said lower members having ends slidably engaged with said flexible support member in combination with each of said lower members having at the inner end thereof a generally inverted V-shaped upper part, tabs adapted to engage the undersides of the edges of said support member and arcuate portions joining the ends of said inverted V-shaped upper part and said tabs, each inverted V-shaped upper part being vertically cut above said tab and having, at the outer end thereof, a portion of each side displaced downwardly so as to be parallel to the plane of and above said flexible support member and thereby slidably engage said support member with minimum lateral rotational play.

5. A windshield wiper assembly comprising a wiping element and an arm-pressure distributing assembly, said wiping element having a flexible support member and a resilient wiping member engaged with said support member and having an edge adapted to contact and wipe a windshield, said pressure-distributing assembly being adapted to receive pressure from a windshield wiper arm and to transmit such pressure to said wiping element, said pressure-distributing assembly comprising at least two elongate members pivotally connected together to form an articulated structure whose members move relative to each other generally in a plane perpendicular to the surface to be wiped, one of said members having at least one pair of laterally spaced-apart inwardly turned tabs joined together by a portion of said last-named member, said portion of said last-named member having a slit cut therein in a direction substantially perpendicular to a plane of said tab and in overlying relation to said tab, a part of each side of said portion of said last-named member being displaced downwardly into a plane parallel to and spaced above the plane containing said tabs, said tabs slidably engaging the underside of the edges of said support member and the displaced part of said portion of said member slidably engaging the topside of the edges of said support member in overlapping relation to said tabs so as to minimize the rotational play between the support member and the pressure-distributing assembly.

* * * * *